United States Patent
Rui et al.

(10) Patent No.: US 7,580,054 B2
(45) Date of Patent: *Aug. 25, 2009

(54) AUTOMATED ONLINE BROADCASTING SYSTEM AND METHOD USING AN OMNI-DIRECTIONAL CAMERA SYSTEM FOR VIEWING MEETINGS OVER A COMPUTER NETWORK

(75) Inventors: Yong Rui, Sammamish, WA (US); Anoop Gupta, Woodinville, WA (US); Johnathan J. Cadiz, Redmond, WA (US); Ross Garrett Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

This patent is subject to a terminal disclaimer.

(21) Appl. No.: 11/193,976

(22) Filed: Jul. 29, 2005

(65) Prior Publication Data

US 2005/0280700 A1     Dec. 22, 2005

Related U.S. Application Data

(63) Continuation of application No. 09/681,843, filed on Jun. 14, 2001, now Pat. No. 6,937,266.

(51) Int. Cl.
*H04N 7/14*  (2006.01)
*G06F 3/00*  (2006.01)

(52) U.S. Cl. .............. 348/14.05; 348/14.01; 348/14.08

(58) Field of Classification Search ... 348/14.01–14.09, 348/14.1, 14.11–14.16, 36, 37, 39, 143, 169–172, 348/211.99, 211.83; 370/260, 261; 715/753, 715/755

See application file for complete search history.

(56) References Cited

U.S. PATENT DOCUMENTS

| | | | |
|---|---|---|---|
| 5,539,483 A | 7/1996 | Nalwa | |
| 5,745,305 A | 4/1998 | Nalwa | |
| 5,778,082 A * | 7/1998 | Chu et al. | 381/92 |
| 5,793,527 A | 8/1998 | Nalwa | |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |

(Continued)

*Primary Examiner*—Melur Ramakrishnaiah
(74) *Attorney, Agent, or Firm*—Lyon & Harr, L.L.P.; Craig S. Fischer

(57) ABSTRACT

An automated system and method for broadcasting meetings over a computer network. The meeting is filmed using an omni-directional camera system and capable of being presented to a viewer both live and on-demand. The system of the present invention includes an automated camera management system for controlling the camera system and an analysis module determining the location of meeting participants in the meeting environments. The method of the present invention includes using the system of the present invention to broadcast an event to a viewer over a computer network. In particular, the method includes filming the event using an omni-directional camera system. Next, the method determines the location of each event participant in the event environment. Finally, a viewer is provided with a user interface for viewing the broadcast event. This user interface allows a viewer to choose which event participant that the viewer would like to view.

20 Claims, 8 Drawing Sheets

U.S. PATENT DOCUMENTS

| | | | |
|---|---|---|---|
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |
| 6,285,365 B1 | 9/2001 | Nalwa | |
| 6,313,865 B1 | 11/2001 | Driscoll, Jr. et al. | |
| 6,331,869 B1 | 12/2001 | Furlan et al. | |
| 6,337,708 B1 | 1/2002 | Furlan et al. | |
| 6,341,044 B1 | 1/2002 | Driscoll, Jr. et al. | |
| 6,346,967 B1 | 2/2002 | Gullichsen et al. | |
| 6,356,296 B1 | 3/2002 | Driscoll, Jr. et al. | |
| 6,356,397 B1 | 3/2002 | Nalwa | |
| 6,369,818 B1 | 4/2002 | Hoffman et al. | |
| 6,373,642 B1 | 4/2002 | Wallerstein et al. | |
| 6,388,820 B1 | 5/2002 | Wallerstein et al. | |
| 6,392,687 B1 | 5/2002 | Driscoll, Jr. et al. | |
| 6,424,377 B1 | 7/2002 | Driscoll, Jr. et al. | |
| 6,426,774 B1 | 7/2002 | Driscoll, Jr. et al. | |
| 6,459,451 B2 | 10/2002 | Driscoll, Jr. et al. | |
| 6,466,254 B1 | 10/2002 | Furlan et al. | |
| 6,469,732 B1 * | 10/2002 | Chang et al. | 348/14.08 |
| 6,480,229 B1 | 11/2002 | Driscoll, Jr. et al. | |
| 6,493,032 B1 | 12/2002 | Wallerstein et al. | |
| 6,515,696 B1 | 2/2003 | Driscoll, Jr. et al. | |
| 6,539,547 B2 | 3/2003 | Driscoll, Jr. et al. | |
| 6,583,815 B1 | 6/2003 | Driscoll, Jr. et al. | |
| 6,593,969 B1 | 7/2003 | Driscoll, Jr. et al. | |
| 6,597,520 B2 | 7/2003 | Wallerstein et al. | |
| 6,700,711 B2 | 3/2004 | Nalwa | |
| 6,731,334 B1 * | 5/2004 | Maeng et al. | 348/211.12 |
| 6,741,250 B1 | 5/2004 | Furlan et al. | |
| 6,756,990 B2 | 6/2004 | Koller | |
| 6,885,509 B2 | 4/2005 | Wallerstein et al. | |
| 6,924,832 B1 | 8/2005 | Shiffer et al. | |
| 2002/0034020 A1 | 3/2002 | Wallerstein et al. | |
| 2002/0063802 A1 | 5/2002 | Gullichsen et al. | |
| 2002/0094132 A1 | 7/2002 | Hoffman et al. | |
| 2002/0154417 A1 | 10/2002 | Wallerstein et al. | |
| 2003/0142402 A1 | 7/2003 | Carbo, Jr. et al. | |
| 2003/0193606 A1 | 10/2003 | Driscoll, Jr. et al. | |
| 2003/0193607 A1 | 10/2003 | Driscoll, Jr. et al. | |
| 2004/0008407 A1 | 1/2004 | Wallerstein et al. | |
| 2004/0008423 A1 | 1/2004 | Driscoll, Jr. et al. | |
| 2004/0021764 A1 | 2/2004 | Driscoll, Jr. et al. | |
| 2004/0252384 A1 | 12/2004 | Wallerstein et al. | |
| 2004/0254982 A1 | 12/2004 | Hoffman et al. | |

* cited by examiner

AUTOMATED ONLINE BROADCASTING SYSTEM AND METHOD USING AN OMNI-DIRECTIONAL CAMERA SYSTEM FOR VIEWING MEETINGS OVER A COMPUTER NETWORK

BACKGROUND OF THE INVENTION

1. Field of the Invention

The present invention relates in general to automated online broadcasting and more particularly to an automated system and method for broadcasting meetings using an omni-directional camera system and presenting the broadcasted meeting to a viewer over a computer network both on-demand and live.

2. Related Art

Meetings are widely used in many settings (such as corporations and universities) to exchange information and ideas as well as transfer knowledge through teaching and learning. A meeting is generally an assembly of persons for a common purpose, such as to discuss a certain topic or subject. It is possible that all persons wanting to view the meeting may not be able to physically be in the room where the meeting is occurring. For example, an interested person may be a distance away from where the meeting is taking place or the meeting room may not be able to accommodate all interested person. Moreover, scheduling and time conflicts may prevent interested persons from attending a meeting they might otherwise want to or be required to attend. Although it is possible for a person who did not attend a meeting to be briefed after the meeting, this is often ineffective. One solution is to broadcast the meeting over a computer network (or online broadcasting) so that the meeting may be viewed using a viewer's computer either as the meeting is occurring ("live") or at a later time that is convenient for the viewer ("on-demand").

Online broadcasting of a meeting is both a convenient and an effective way to experience the meeting. If the meeting is broadcasted online (such as, for example, over the Internet or a corporate network), the meeting may be viewed from remote locations (such as home) or from an office in another city. Moreover, if a person cannot view the meeting at the meeting time, recording the meeting and broadcasting the recorded meeting on-demand allows a person to view the meeting generally anytime and at the convenience of the person. Moreover, viewing a video of the meeting may also save time by allowing a person to view only those portions of the meeting that the viewer deems relevant. In addition, a video of the recorded meeting can be effective as a memory-jogging tool allowing, for example, critical decisions made during the meeting to be reviewed.

The expense associated with online broadcasting of a meeting, however, serves to deter the online broadcasting of the majority of meetings that occur. These costs include the cost of planning to record and broadcast the meeting, the cost of equipping the meeting room with the video production equipment, and the significant cost of a human video production team. For example, a video production team includes a camera operator to film the meeting, an editor to edit the camera output, and a publisher to broadcast the meeting over a computer network. Equipment cost is a one-time cost and tends to become less expensive as market demand increases. Labor cost for a video production team, however, is a recurring cost and one is of the main prohibitions to the online broadcasting of meetings. In addition to the cost, the presence of a camera operator in a meeting often disrupts and perturbs the group dynamics of the meeting.

Recent advances in computer vision and signal-processing technologies have made feasible the possibility of automating the online broadcasting of a meeting. One such automated video production technique is discussed in co-pending application Ser. No. 09/681,835, filed on Jun. 14, 2001, entitled "Automated video production system and method using expert video production rules for online publishing of lectures". Automated video production systems and methods that allow high-quality broadcasting of a meeting over a computer network are highly desirable because the labor costs associated with online broadcasting are greatly reduced. Because labor costs are a major obstacle to the online broadcasting of meetings, high-quality automated camera management provides greater incentive for the online broadcasting of meetings or other events.

Accordingly, there exists a need for an online broadcasting system and method that is automated to alleviate labor costs associated with broadcasting a meeting over a computer network. What also is needed is an automated online broadcasting system and method that provides a high-quality broadcast to viewers. What is further needed is an automated online broadcasting system and method that provides a rich and customized viewing experience for a viewer such that the viewer has a variety of options available when viewing the broadcasted meeting. Thus, one viewer is able to customize his viewing experience of a meeting to his particular desires and another viewer of the same meeting is able to customize her viewing experience to her desires. This ensures that viewers of the broadcasted meeting as afforded a beneficial and positive viewing experience.

SUMMARY OF THE INVENTION

To overcome the limitations in the prior art as described above and other limitations that will become apparent upon reading and understanding the present specification, the present invention includes an automated online broadcasting system and method for broadcasting meetings over a computer network. The meetings may be broadcast either live or on-demand upon request. Because the system is automated, the labor costs associated with broadcasting a meeting are virtually eliminated. The meetings are filmed using an omni-directional camera system that provides an omni-directional image of the meeting environment. Multiple camera views may be obtained from this omni-directional image. In one implementation, the omni-directional camera system includes a high-resolution camera and uses a curved mirror device. The present invention also includes user interfaces that allow viewers to select which meeting participant they would like to view. The user interfaces are constructed from several novel user interface components that provide a viewer with a customized and enriched viewing experience of the meeting.

In general, the automated online broadcasting system of the present invention includes an omni-directional camera system that films an event (such as a meeting), an automated camera management system for controlling the camera system, and a viewer system for facilitating viewing of the broadcast meeting. The automated online broadcasting system also includes an analysis module for determining where meeting participants are located in the meeting environment, and an annotation module. The annotation module allows the capture of audio and sub-events associated with meeting. For example, the annotation module is capable of capturing annotations (or shared workspaces) such as a whiteboard, a digital chat regarding the meeting, and a digital question and answer session over a network. These stored annotations are synchronized with the meeting and stored in a database to be linked to a media file on command during viewing. Moreover, which annotations to store may be decided by a viewer during or after the event has occurred.

The automated camera management system includes the omni-image rectifier that takes the warped raw image captured by the high-resolution omni-directional camera and de-warps the image to present a normal image. Moreover, the automated camera management system also includes a tracker module that may use motion-detection and skin-color tracking to decide how many people are in the meeting and track them. In addition, a virtual director module decides which camera view is best to display to a viewer by using and applying a set of expert video production rules. Because the present invention captures the entire visual information of the meeting environment, delays caused by camera switching latency is reduced or eliminated.

The method of the present invention includes using the system of the present invention to broadcast an event to a viewer over a computer network. In particular, the method includes filming the event using an omni-directional camera system. Next, the method determines the location of each event participant in the event environment. Finally, a viewer is provided with a user interface for viewing the broadcast event. This user interface allows a viewer to choose which event participant that the viewer would like to view. This online broadcasting method provides the viewer with a positive and customizable viewing experience.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention includes an automated online broadcasting system and method that uses an omni-directional camera system. The panoramic capability provided by an omni-directional camera system provides a number of features for user interfaces. These user interfaces enable a viewer to have a rich and positive experience viewing the meeting. For example, the present invention enables a viewer to see everyone present at the meeting. In addition, the viewer can control the view of the meeting manually or let the computer control. If the meeting is recorded and viewed later on-demand, the viewer is able to browse and search the recorded video as desired. All of these features provided by the present invention allow a viewer to customize and enrich the viewing experience.

II. General Overview

Several of the user interface features available in the present invention are made possible by the use of an omni-directional camera system. This omni-directional camera system provides an approximately 360-degree view of a meeting environment. In order to achieve this, the omni-directional camera system used in the present invention may include a single wide-angle camera that is capable of providing a panoramic (such as a 360-degree) view. By way of example, the omni-directional camera may achieve this wide-angle field-of-view by using a wide-angle imaging device (such as a curved mirror device) so that the camera is aimed at the curved mirror device. The omni-directional camera system also may include a plurality of panoramic camera providing multiple 360-degree views of the meeting environment. The omni-directional camera system also may include a plurality of cameras having less than a 360-degree field-of-view. In this case, the plurality of cameras may be arranged so that the plurality of cameras together provide an approximately 360-degree field-of-view of the meeting environment.

Figure 1:
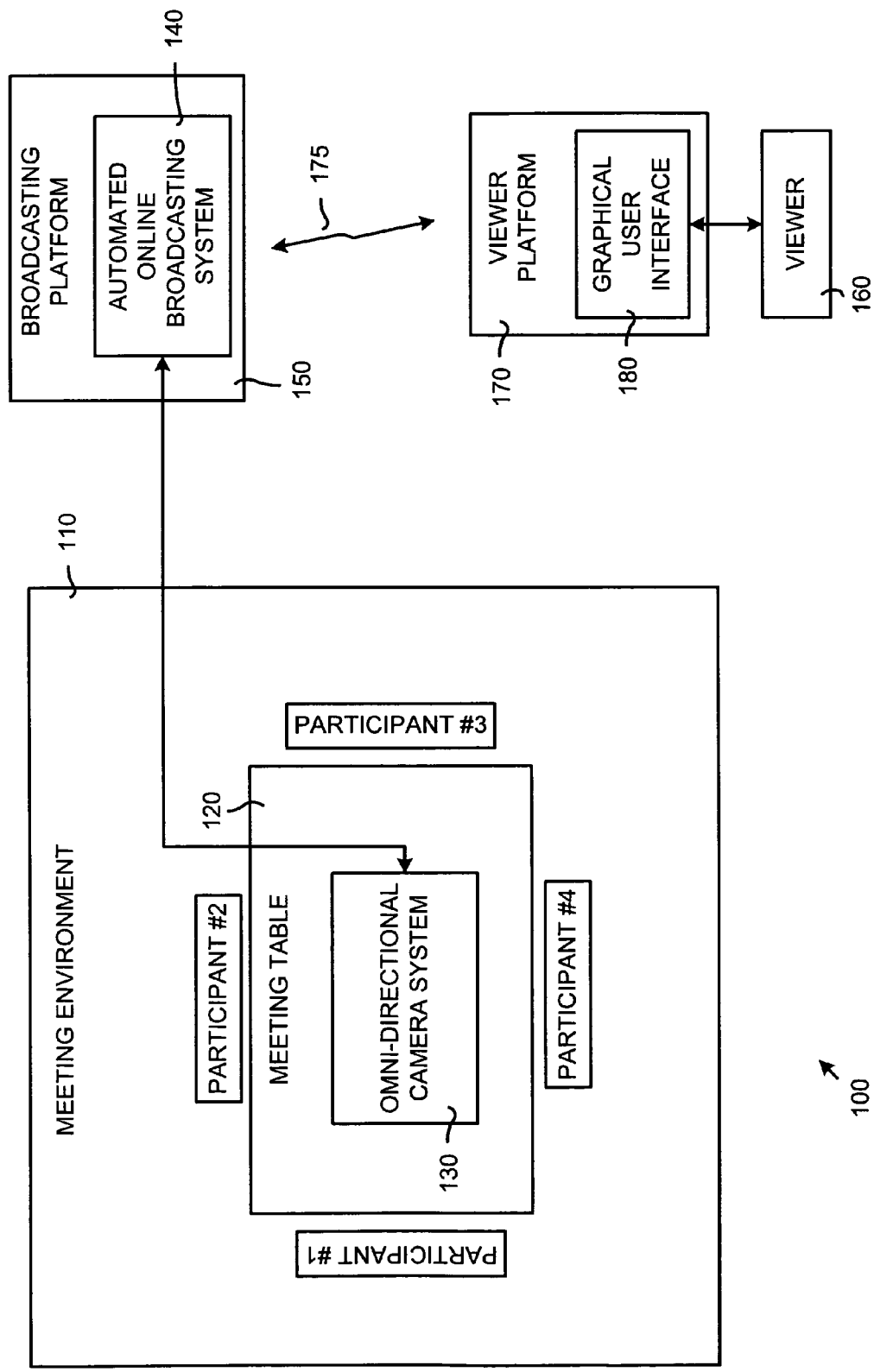
FIG. 1 is an overall block diagram illustrating an implementation of the automated online broadcasting system of the present invention in an automated event presentation system and is provided for illustrative purposes only.

The present invention includes an automated online broadcasting system and method using an omni-directional camera system for viewing meetings over a computer network. FIG. 1 is an overall block diagram illustrating an implementation of the automated online broadcasting system of the present invention in an automated event presentation system and is provided for illustrative purposes only. In general, the automated event presentation system 100 automatically films the event (such as a meeting), broadcasts the event, and facilitates viewing of the broadcasted event. In addition, the automated event presentation system 100 may record the meeting for on-demand viewing at a later time.

In the exemplary implementation shown in FIG. 1, a meeting is occurring in a meeting environment 110 (such as a meeting room). The meeting environment 110 includes a meeting table 120 having a plurality of meeting participants around the table 120. In particular, participant #1, participant #2, participant #3 and participant #4 are all meeting participants taking part in the meeting. It should be noted that although four meeting participants are shown, a lesser or greater number of participants may be present at the meeting.

The meeting is filmed using omni-directional camera system 130 disposed on the meeting table 120. As described above, the omni-directional camera system 130 may be an array of cameras having a 360-degree field-of-view or may be a single panoramic camera. In this exemplary implementation, the omni-directional camera system 130 includes a high-resolution single panoramic camera that uses a curved mirror device to provide a virtually 360-degree view of the meeting environment 110. In another implementation, an array of cameras is used in a circular configuration. In this configuration, each camera is pointing outward and has a field-of-view of less than 360 degrees. The individual camera views (or images) are stitched together with image processing algorithms to construct a panoramic image. The resultant panoramic images are functionally equivalent to those captured with a single imaging sensor panoramic camera. Because the omni-directional camera system 130 captures an omni-directional image of the meeting environment 110, the camera system 130 is capable of simultaneously monitoring meeting participants and filming the meeting.

The omni-directional camera system 130 is connected to an automated online broadcasting system 140 that provides controls the filming and broadcasting of the meeting. The automated online broadcasting system 140 resides on a broadcasting platform 150. The meeting may be recorded by the omni-directional camera system 130, stored on the broadcasting platform 150 and made available upon request to a viewer 160. Whether on-demand or live, the viewer 160 obtains and views the meeting using a viewer platform 170. The viewer platform is in communication with the broadcasting platform 150 over a communication channel 175 (such as a computer network). The viewer 160 is able to interface with the meeting while the meeting is being viewed by using a graphical user interface 180 residing on the viewer platform 170. As explained in detail below, the graphical user interfaces of the present invention include several features that provide the viewer 160 with a rich and customized viewing experience of the meeting.

Figure 2:
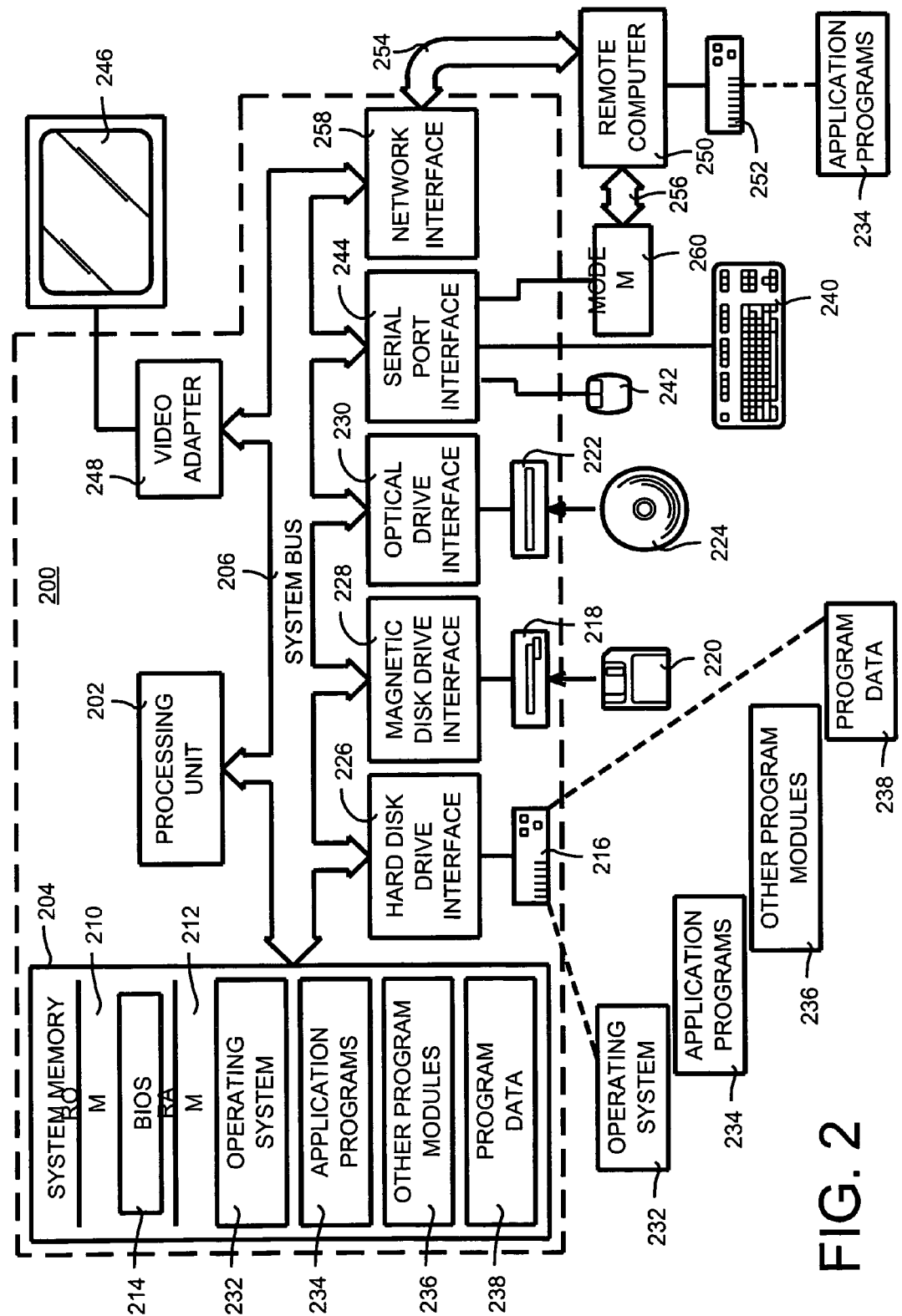
FIG. 2 is a general block diagram illustrating a computing platform as shown in FIG. 1 that preferably may be used to carry out the present invention.

In one embodiment of the present invention the broadcasting platform 150 and the viewer platform 170 are computing machines (or devices) in a computing environment (such as a client/server networking environment). FIG. 2 is a general block diagram illustrating a computing platform as shown in FIG. 1 that preferably may be used to carry out the present invention. FIG. 2 and the following discussion are intended to provide a brief, general description of a suitable computing environment in which the automated online broadcasting system and method of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

Referring to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a camera, a microphone, a joystick, a game pad, a satellite dish, a scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. Components and Operation of the Invention

Figure 3:
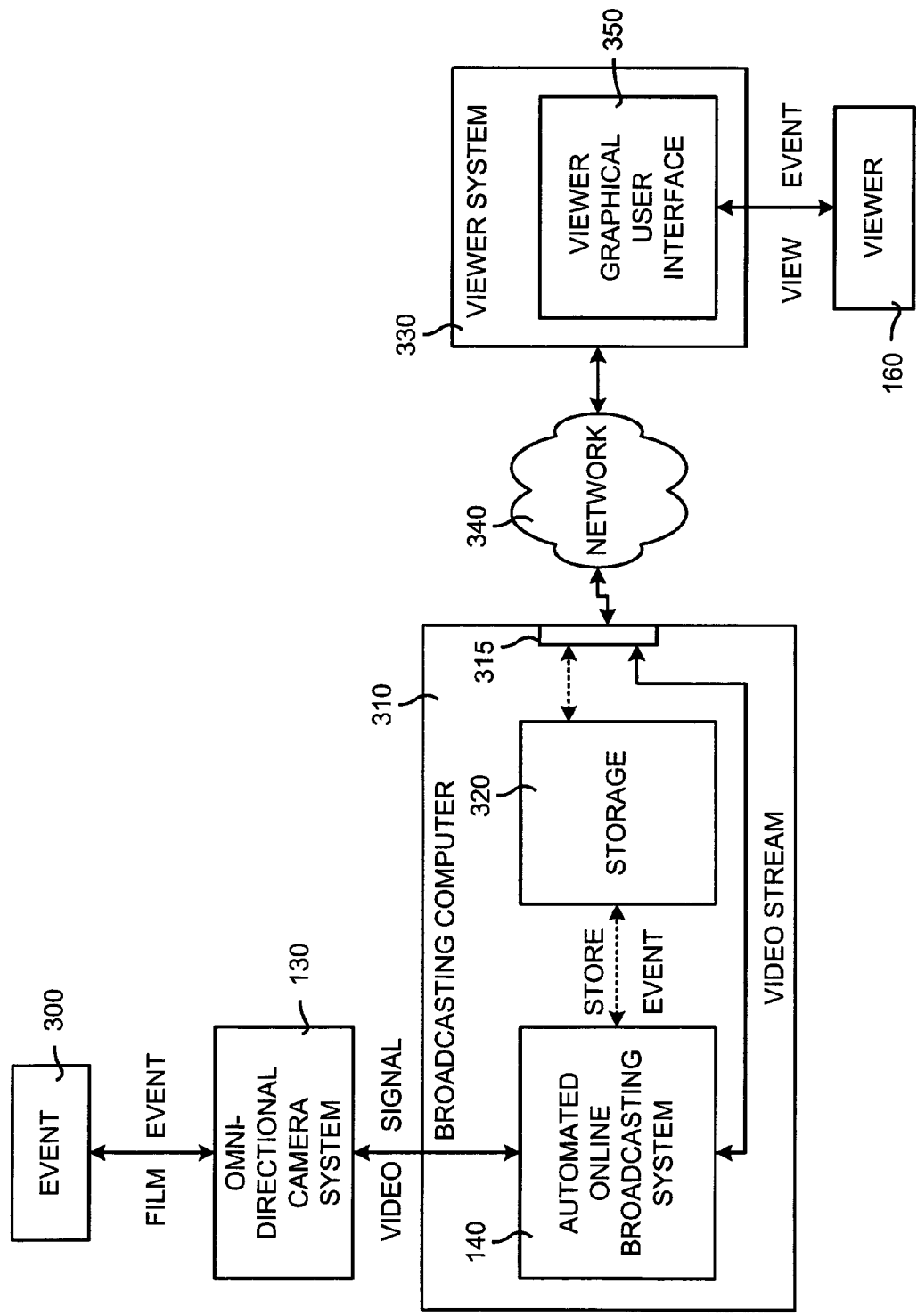
FIG. 3 is a general block diagram illustrating the major components of the present invention.

The present invention includes an automated online broadcasting system and method using an omni-directional camera system to view meetings. FIG. 3 is a general block diagram illustrating the major components of the present invention. An event 300 (such as a meeting) is filmed by the omni-directional camera system 130 of the present invention. The automated online broadcasting system 140 provides control and receives input from the omni-directional camera system 130. The automated online broadcasting system 140 resides on a broadcasting computer 310. As shown in FIG. 3, if the event 300 is to be broadcast live then a video signal is sent from the omni-directional camera system 130 to the automated online broadcasting system 140 for processing. Next, a video stream is sent from the automated online broadcasting system 140 to a network adapter 315.

If the event 300 is to be recorded, then the video signal is stored in a storage 320 that resides on the broadcasting computer 310. Upon request from the viewer 160, the recorded meeting in the storage 320 is sent to the network adapter 315. The broadcasting computer 310 is in network communication with a viewer system 330 over a network 340. In both the live and on-demand situations, the video stream of the meeting is sent from the network adapter 315 over the network 340 to the viewer system 330. The viewer 160 is able to view the broadcast meeting using a viewer graphical user interface 350 that resides on the viewer system 330.

Figure 4:
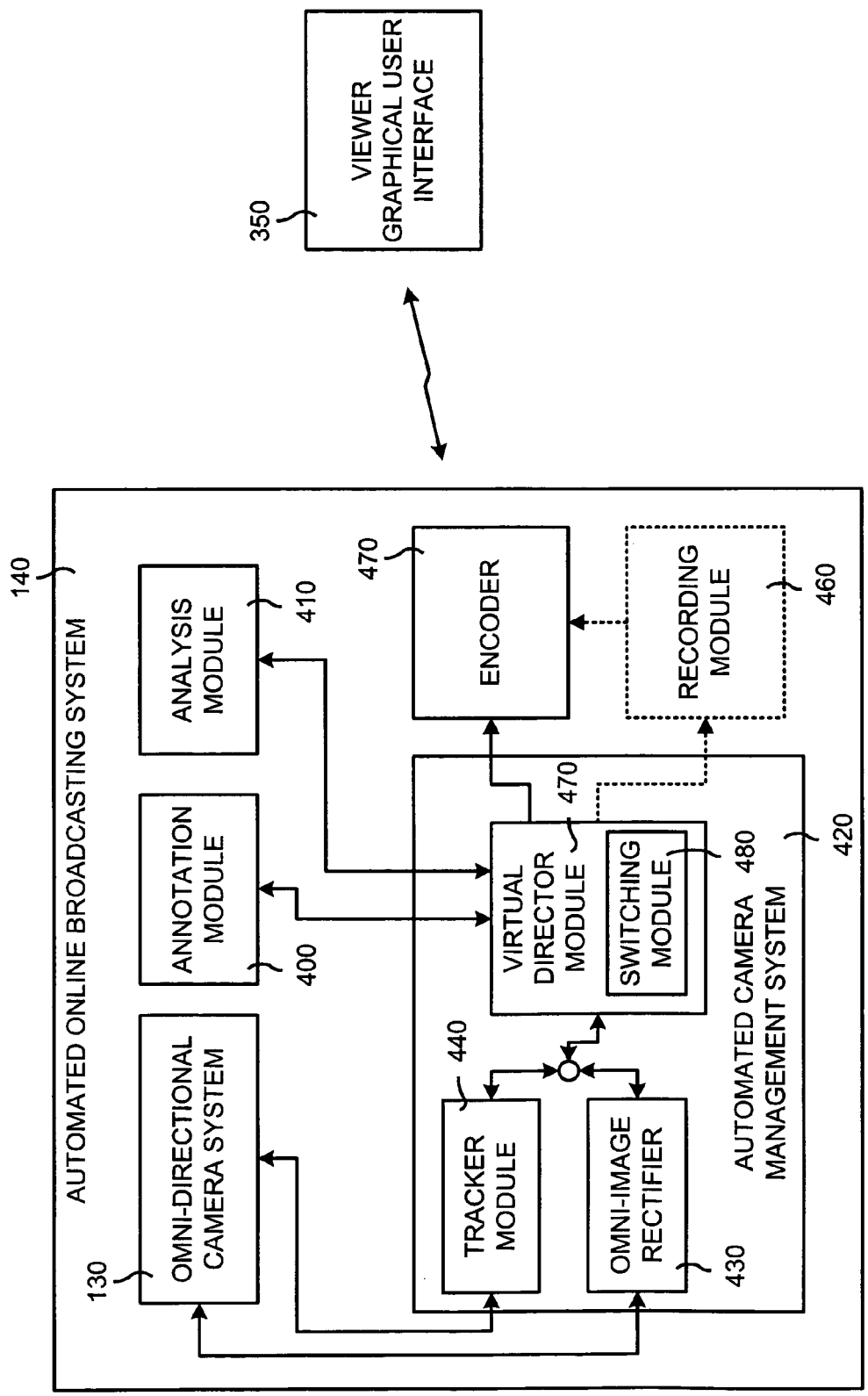
FIG. 4 is a detailed block diagram illustrating the components of and the interaction between the automated online broadcasting system and the viewer graphical user interface shown in FIG. 3.

FIG. 4 is a detailed block diagram illustrating the components of and the interaction between the automated online broadcasting system 140 and the viewer graphical user interface 350 shown in FIG. 3. A meeting presentation system 400 of the present invention (an example of the system 400 is the automated event presentation system 100 shown in FIG. 1) includes the automated online broadcasting system 140 for broadcasting a meeting over a computer network and a viewer graphical user interface 350 for allowing a viewer 160 to view the broadcast meeting.

The automated online broadcasting system 140 includes the omni-directional camera 130 for providing a panoramic view of a meeting environment. In one implementation of the present invention, the omni-directional camera system 130 has a resolution of 1000×1000 pixels, 10 frames per second, and uses a parabolic mirror device to provide the panoramic view. However, if should be noted that several other implementations are possible, and a lesser or greater number of pixels and frames rates may be used. While the omni-directional camera system 130 is used to provide a video and audio portion of a meeting, an annotation module 400 is used to capture sub-events associated with the meeting. By way of example, this includes shared workspaces such as a whiteboard, an e-mail exchange concerning the meeting, a digital chat about the meeting, and a digital question and answer session. The annotations captured by the annotation module 400 are synchronized to the captured meeting.

The automated online broadcasting system 140 also includes an analysis module 410 for finding and indexing subjects in the meeting environment. In order to find the speaker, a number of speaker detection techniques may be used. In general, a speaker detection technique follows the event participants that are speaking by switching from one camera view to another camera view. One type of speaker detection technique is a microphone array technique that uses microphone arrays and sound source localization algorithms to determine who is talking. The information about who is currently speaking is indexed by the analysis module 410. As discussed in detail below, for on-demand viewing, a viewer can use this indexed information contained in the analysis module 410 to search the recorded video for a desired speaker and desired subject or topic.

The omni-directional camera system 130, the annotation module 400 and the analysis module 410 are in communication with an automated camera management system 420 for managing the filming of the meeting. The automated camera management system 420 includes an omni-image rectifier 430, which processes the raw video signal from the omni-directional camera system 130, a tracker module 440, which controls the omni-directional camera system 130 using tracking techniques, determines the number of meeting participants and keeps track of them. The automated camera management system 420 also includes a virtual director module 450 that uses a set of expert video production rules to determine which camera view to use as an output camera view. In some implementations of the present invention the omni-directional camera system 130 covers an area that may normally require multiple cameras. Because of this, the term "camera view" as used in this specification is used to refer to a portion of the omni-directional image produced by the omni-directional camera system 130. It should be noted that the camera views do not need to be adjacent pixels of the omni-directional image. In other words, the virtual director 450 of the present invention can synthetically compose a camera view that includes two persons shown side-by-side who are physically on opposite side of the meeting room.

The automated online broadcasting system 140 also includes a recording module 460 for recording the meeting if desired. Because this is an optional feature, the recording module 460 is shown in dashed lines. If the meeting is recorded, then a camera view selected by the virtual director 450 is output to the recording module 460 where the meeting video is stored. When requested by a viewer, the recording module 460 sends the recorded video to an encoder 470 for broadcasting over a computer network. If the meeting is to be broadcast live, the output camera view is sent from the virtual director module 450 to the encoder 470 for encoding and then broadcast over the computer network.

In one implementation the omni-directional camera system 130 uses a parabolic mirror device. In this case the raw image filmed by the omni-directional camera system 130 is warped. However, because the geometry of the parabolic mirror device can be computed by using computer vision calibration techniques, the omni-image rectifier 430 can de-warp the image to normal images. In this manner, a 360-degree omni-directional image of the entire meeting environment can be constructed from the raw panoramic image provided by the omni-directional camera system 130.

In one implementation the tracker module 440 uses motion detection and skin color techniques to decide how many people are in a meeting and track them. Several person-tracking techniques currently are available, each of which is designed for a different application. Some are designed for very accurate pixel-resolution tracking, but require initial identification of objects. Others do not require initialization but are only good for frontal views of face. In the present invention, it cannot be assumed that initialization is possible or that faces are always frontal. Thus, motion detection and skin color tracking techniques are preferred. Because people rarely sit still, motion can be used to detect the regions of a video that contain a person. A statistical skin-color face tracker can be used to locate a person's face in the region so that the video frame can be properly centered. This person-tracker does not require initialization, works in cluttered background, and runs in real time. These motion detection and skin color tracking techniques are well known in the art and will not be discussed in detail.

As mentioned above, the virtual director module 450 decides on the best camera view to display to a viewer. There are many strategies virtual director module 450 can use to determine the output camera view. The simplest strategy is to cycle through all the participants, showing each person for a fixed amount of time. Another strategy is to show the person who is talking. However, sometimes users want to look at other participants' reaction instead of the person talking, especially when one person has been talking for too long. The virtual director module of the present invention uses expert video production rules to determine the output camera view. This is discussed in detail in co-pending application Ser. No. 09/681,835, filed on Jun. 14, 2001, entitled "Automated video production system and method using expert video production rules for online publishing of lectures".

In a one implementation, the following expert video production rules are used by the virtual director module 450:

1. When a new person starts talking, switch the camera to the new person, unless the camera has been on the previous person for less than a specified amount of time. As an example, this amount of time may be approximately 4 seconds;
2. If the camera has been on the same person for a longer than a specified amount of time, then switch to one of the other people (randomly chosen) for a short duration (e.g., 5 seconds), and switch back to the talking person, if he/she is still talking. By way of example, in one implementation if the camera view has been shown a person for more than approximately 30 seconds the camera view is changed to another person for approximately 5 seconds, and then switched back to the original speaker.

In this preferred embodiment, the virtual director module is implemented using probabilistic finite state machines to provide a flexible control framework. The parameters to the rules above are easily changeable, plus many of the parameters are sampled from distributions, so that the director does not seem mechanical to the human viewers.

The virtual director module 470 includes switching module 480 that allows a camera view to be switched without delay. Even a short delay between the time when a person begins speaking and the time when the camera view shows the speaker can be quite distracting to a viewer. This camera switching latency can distract the viewer to the point that the viewer has a negative viewing experience. The present invention alleviates this camera switching delay because the omni-directional camera system provides an omni-direction image containing all subjects in the meeting environment. The omni-directional camera system captures everything in the meeting environment. For live broadcasting, each of the meeting participants can be monitored simultaneously such that there is little delay in switching from one camera view to another with the speakers change. For recorded (on-demand) broadcasting, any camera switching latency errors can be corrected and even eliminated. This is achieved by determining the delay that exist between the time a new speaker starts talking and the camera switches to the speaker. This delay can be subtracted out of the recorded video. Because the omni-directional camera system has captured the entire visual information of the meeting environment for each point in time, the camera view can be changed at whatever time is desired. Current prior art systems cannot achieve this because they do not capture the entire visual information of the meeting environment for each point in time. Moreover, for the recorded meeting it is even possible to achieve camera switching in negative time (or negative switching). In other words, the camera view changes from the person talking to the person that will talk next even before the next person starts talking.

Figure 5:
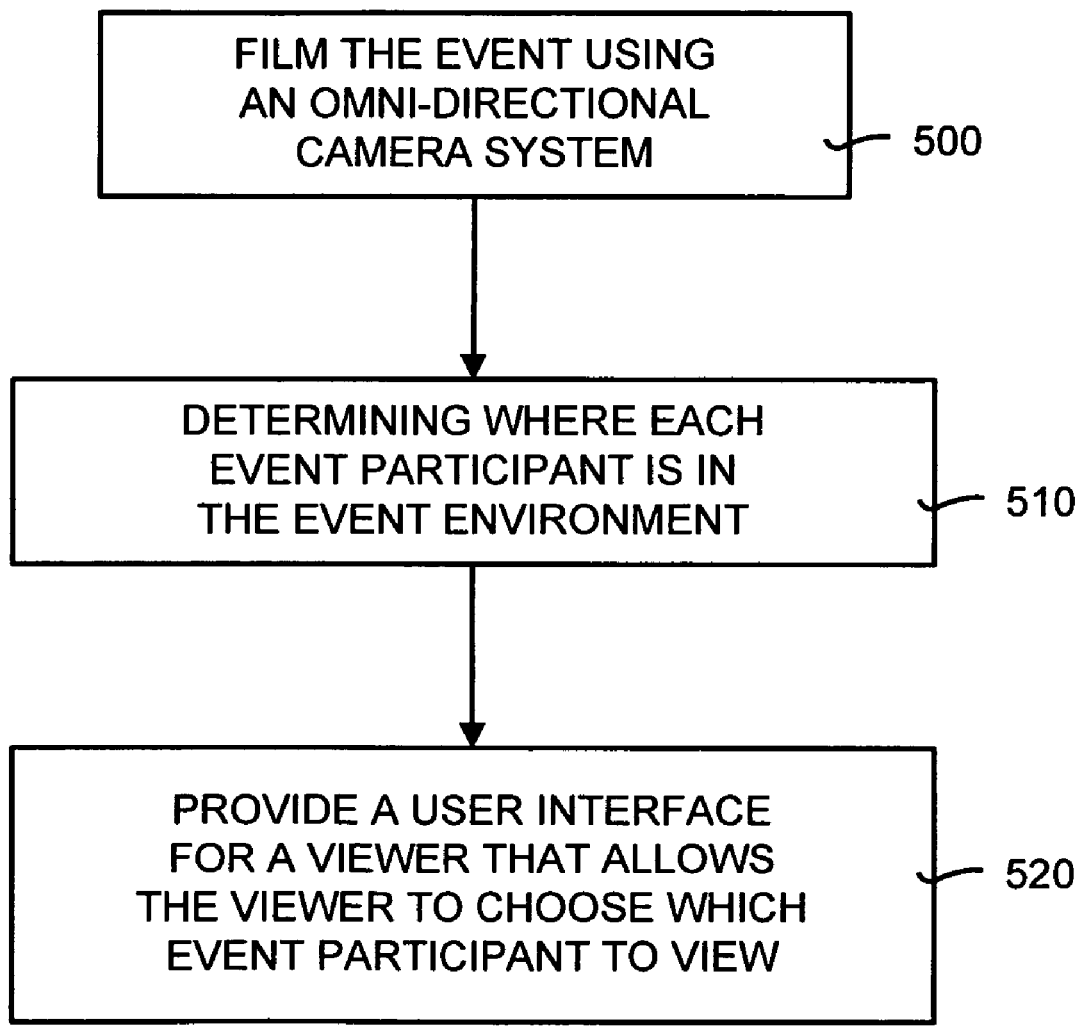
FIG. 5 is a general flow diagram illustrating the operation of the invention.

FIG. 5 is a general flow diagram illustrating the operation of the invention. In particular, an event (such as a meeting) is filmed using an omni-directional camera system (box 500). Next, it is determined where each participant in the event is located in the event environment (box 510). Finally, a user interface is provided for a viewer to choose which event participant to view (box 520).

IV. User Interfaces

The present invention includes several user interface components. Each of these components may be mixed and matched to build a user interface that best suits the needs of a viewer. Some of the user interface components may be used for both live and on-demand viewing. Other user interface components may only be used for on-demand viewing.

For both live and on-demand viewing, the present invention includes several user interface components. One of these components is an overview window. The overview window provides a 360-degree panoramic view of the meeting environment and participants. Another user interface component is a focus window. The focus window provides a camera view of the meeting participant who is speaking. Still another user interface component is a tool that allows a viewer to zoom in or out on a specific portion of the overview window. In one implementation, the tool allows the viewer to zoom in or out on any portion of the overview window by positioning a cursor over the area and clicking. In another implementation, the viewer is provided with buttons that the viewer must click on to enable the particular camera view represented by the button. Another user interface component is an indictor symbol to indicate which of the meeting participants is currently speaking.

In one implementation the buttons are picture buttons that represent each of the meeting participants. The present invention generates the picture buttons as follows. First, the analysis module 410 determines which meeting participant is speaking. Next, an image of each of the participants is obtained from the omni-directional camera system 130. The images are scaled to a size to fit the button and the buttons are generated on the user interface.

For on-demand viewing another user interface component of the present invention is a browsing and searching component. This component allows a viewer to browse and search an indexed video. Using the browse and search component, the viewer can search for a particular desired feature of the video. By way of example, the viewer could search for each time a certain person was speaking during the meeting. Moreover, the viewer could search for a desired topic and the indexed transcript of the meeting would be accessed to search for the topic. Another on-demand user interface component is an index component that presents to the viewer an indexed time-line of certain events. For example, the viewer may wish to see a representation of when each meeting participant spoke during the meeting. In this case, the index component may be a timeline having a different color associated with each participant and graphically illustrating when each participant spoke during the meeting.

Using the above user interface components, user interfaces can be constructed that allow viewers to customize and enrich the viewing experience of a meeting. The user interfaces exploit the capabilities of the omni-directional camera system in order to provide a viewer with a high-quality viewing experience. Among the user interfaces, some show full-resolution video of all meeting participants while others have only one main video window. Some have overview windows while others do not. Some are user-controlled while others are computer-controlled. As discussed further below, each of the user interfaces of the present invention were included in a user study to determine which features users preferred. Through this study, a preferred user interface was chosen that provided the features most wanted by users.

Some of the user interfaces allow the viewer to see all the meeting participants all the time while some interfaces show only the "active" meeting participant (such as the participant that currently is talking). Some of the user interfaces allow the viewer to control the camera themselves, some allow the computer to control the camera views, and some allow both. In addition, some user interfaces include the overview window. Exemplary user interfaces incorporating some of the above-mentioned user interface components will now be discussed.

All-up User Interface

Figure 6:
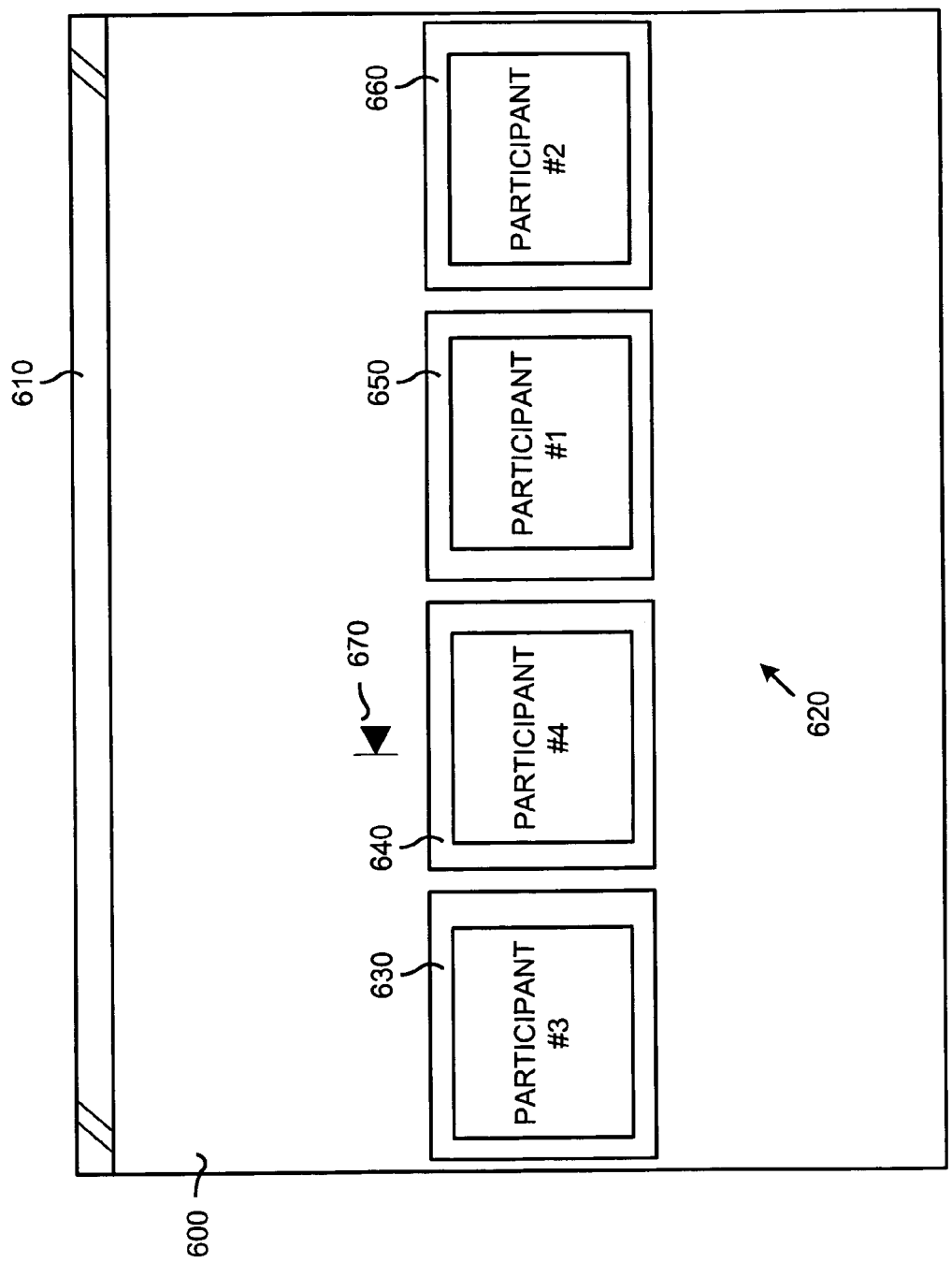
FIG. 6 illustrates the "all-up" graphical user interface embodiment according to the present invention.

FIG. 6 illustrates the "all-up" graphical user interface embodiment according to the present invention. The all-up user interface 600 includes a standard task bar 610 and an overview window 620. The overview window displays each of the meeting participants in a sub window. Thus, in FIG. 6, participant #3 is shown in a first sub-window 630, participant #4 is shown in a second sub-window 640, participant #1 is shown in a third sub-window 650 and participant #2 is shown in a fourth sub-window 660.

In a preferred embodiment, all participants in the meeting are displayed side-by-side. For example, if there are N meeting participants the all-up user interface 600 requires that all N video streams (one corresponding to each participant) be stored on the event server, and that all N be delivered to the client system. In this example, assuming 4 people and each stream requiring 256 Kbps bandwidth, the all-up interface requires 1 Mbps of storage (~500 Mbytes/hour) on the server and 1 Mbps of bandwidth to the client. While this should be easy to support on corporate intranets, it may be difficult to residential customers, even using a digital subscriber line (DSL).

In an alternate embodiment the all-up user interface presents the entire panoramic view of the entire room. One problem with this embodiment, however, is that it is an inefficient use of both bandwidth and storage space. On the other hand, one advantage of this embodiment is that the system is more scalable as an increasing number of people become present in the meeting.

Preferably, a speaker icon 670 is placed over the meeting participant that is currently speaking. If the current speaker stops talking and another participant starts talking, the speaker icon moves to a location over the sub-window of the meeting participant that just started talking. Alternatively, the all-up user interface 600 may not include the speaker icon 670.

User-Controlled+Overview User Interface

Figure 7:
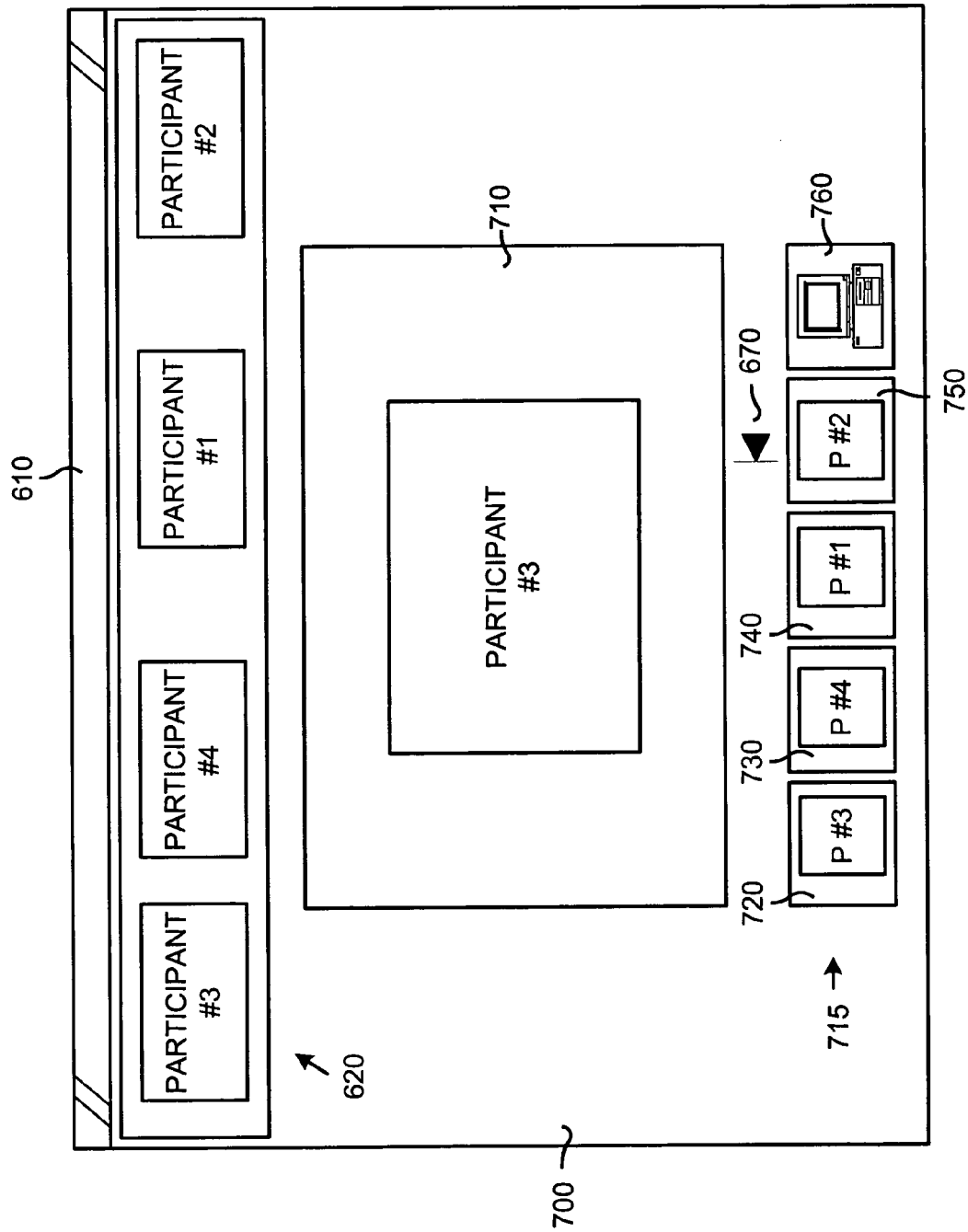
FIG. 7 illustrates the preferred "user-controlled+overview" graphical user interface embodiment according to the present invention.

FIG. 7 illustrates a "user-controlled+overview" user interface embodiment according to the present invention. The user-controlled+overview user interface 700 allows a user to control the camera, allow the computer to control the camera, and provide the overview window described above. It should be noted that even though this interface 700 is called a user-controlled interface, it actually combines both a user-controlled and a computer-controlled interface. The user-controlled+overview user interface 700 is the preferred user interface for the present invention. The user-controlled+overview user interface 700 includes the standard task bar 610 and the overview window 620 showing each of the meeting participants. In addition, there is a main video window 710 that shows the meeting participant selected by the user (if user-controlled) or by the computer (if computer-controlled). As shown in FIG. 7, in this example participant #3 has been selected and is shown in the main video window 710.

A window selection bar 715 is located toward the bottom of the interface 700 and, in a preferred implementation, includes a picture button for each meeting participant. Each of these picture buttons show images of the corresponding participant. As shown in FIG. 7, participant #3 (P#3) is a first icon 720, participant #4 (P#4) is a second icon 730, participant #1 (P#1) is a third icon 740, and participant #2 (P#2) is a fourth icon 750. Alternatively, the participant icons 720, 730, 740, 750 of window selection bar 715 may be omitted and a user would click directly on the person in the overview window 620 whom the user wants to see. The window selection bar 715 also includes a computer icon 760 denoting computer control of the camera. If a user clicks on any meeting participant icon 720, 730, 740, 750 the meeting participant corresponding to the picture button will be displayed in the main video window 710. If the user clicks on the computer icon 760, the computer (e.g. the virtual director module of the present invention) will take control of who is displayed in the main video window 710.

In one implementation the main video window shows the meeting participant selected, and the overview window 620 is a full 360-degree panorama so that spatial relationships/interactions between people can be seen. Alternatively, the overview window 620 could include a small version of the all-up interface (as describe above) whereby several small windows (one for each participant) are shown). Preferably, viewers can click the five picture buttons of the window selection bar 715 to control the camera. In an alternate embodiment, the buttons could be placed underneath the overview window 620 so that a button corresponding to a participant is spatially related to that participant's position in the overview window 620. In another alternate embodiment, the overview window 620 could be used to change the camera view such that if a user clicked on a person in the overview window 620 the camera would change to show that person. Preferably, an indicator symbol in the form of a speaker icon 670 is shown on the interface 700 above the person who is talking.

Given that the user can control whom is seen, this interface 700 requires that the event server store all N video streams (one corresponding to each participant) as in the all-up interface 600, plus the overview stream separately. From a bandwidth perspective, the bandwidth used is only two times of what is needed by one person's video (half of the bandwidth is needed for the main video window 710 and half of the bandwidth is needed for the overview window 620), thus 512 Kbps using the parameters mentioned earlier.

User-Controlled User Interface

Figure 8:
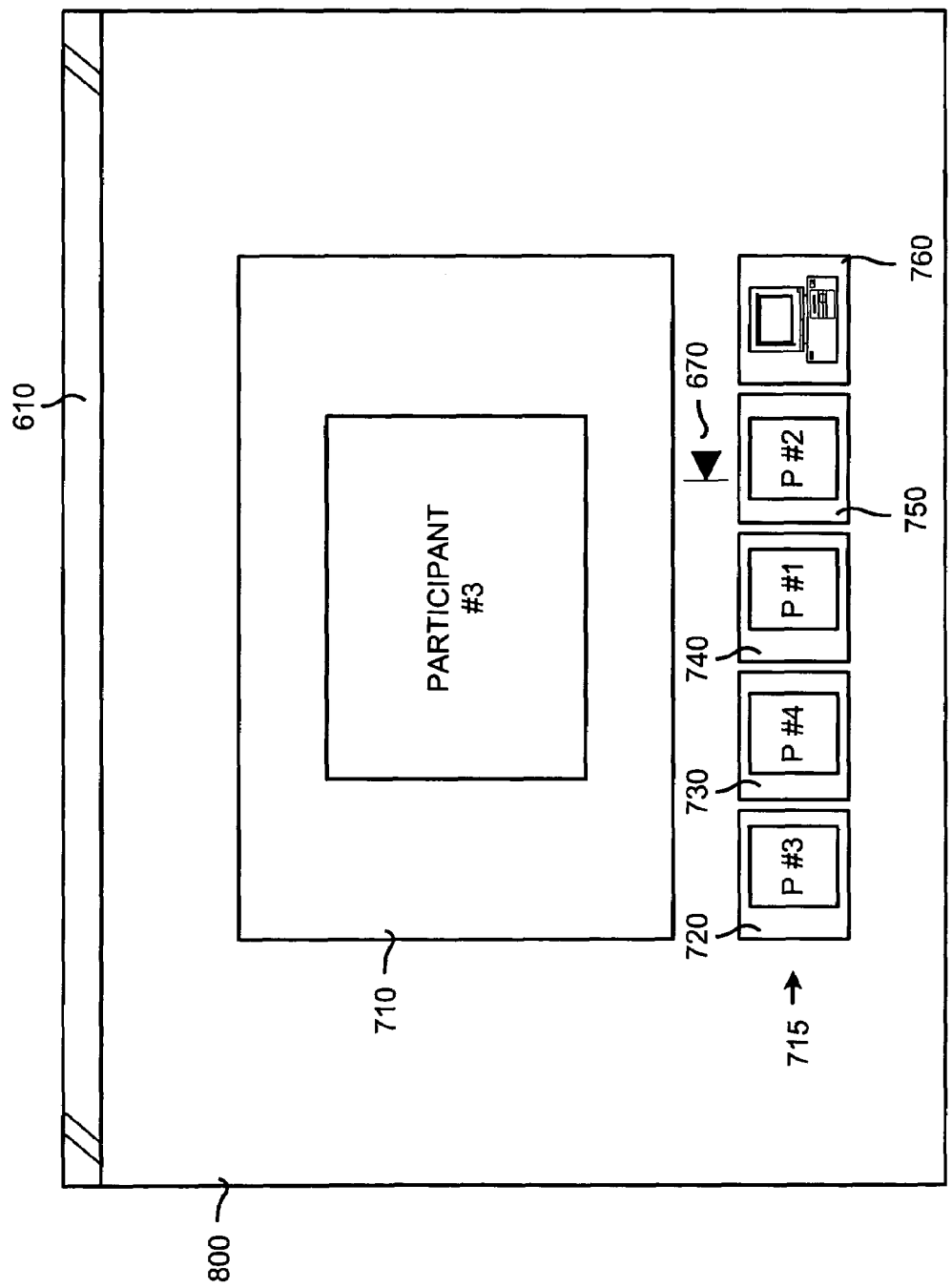
FIG. 8 illustrates the "user-controlled" graphical user interface embodiment according to the present invention.

FIG. 8 illustrates the "user-controlled" graphical user interface embodiment according to the present invention. The user-controlled interface 800 includes a standard task bar 610. Note that the user-controlled interface 800 lacks the overview window 620. Thus, the user-controlled interface 800 is similar to the user-controlled+overview interface 700, without the overview window 620. The storage requirements on the event server are the same as the all-up interface 600, but the bandwidth to the client is 1/Nth that needed by the all-up interface (i.e., only 256 Kbps using the example above).

Computer-Controlled+Overview User Interface

The present invention also includes two other user interfaces. Namely, a computer-controlled+overview interface that similar to the user-controlled+overview interface 700, except that a viewer cannot press the buttons to change the camera shot. In other words, the video in the main video window is controlled by the virtual director module based on expert video production rules described previously.

Because a viewer has no control over the camera, only the view selected by virtual director needs to be stored on the event server. Thus the storage needed on the event server is only twice that needed by single stream (1× for main video, and 1× for overview), and the bandwidth needed is only twice of single stream. The fact that storage and bandwidth requirements are independent of the number of participants in the meeting makes the computer-controlled+overview interface more scalable than the previous interfaces.

Computer-Controlled User Interface

Another user interface of the present invention is a computer-controlled interface.

The computer-controlled interface is similar to the computer-controlled+overview interface without the overview window. Thus, a user sees the video selected by the virtual director module. For this interface, both the storage requirements and bandwidth requirements are only that required by single video stream. This roughly translates to 125 Mbytes/hour for storage and 256 Kbps of bandwidth using the example above.

V. Working Example and User Interface Study Results

The following discussion presents results from a study of the user interfaces. The focus of this user study was to examine interfaces for viewing meetings broadcast by the automated online broadcasting system and method of the present invention and to understand user preferences and system implications. For this user study, the user interfaces of the present invention discussed above were used to understand users' preferences concerning a number of features. For example, the user study obtained user preferences on the following: (a) seeing all the meeting participants all the time versus seeing the "active" participant only; (b) controlling the camera themselves vs. letting the computer take control; and (c) the importance of alleviating camera switching latency.

One part of the user interface study determined whether the study participants preferred to see all the meeting participants. It should be noted that the results suggest a general trend that the user interfaces showing all meeting participants was favored over the user interfaces showing only a single participant. This seems to indicate that viewers prefer the user interface that shows all the meeting participants rather than just the meeting participant that is speaking.

For each user-controlled user interface, all buttons on the interfaces that were clicked by the study participants were logged. Two groups seem to emerge from this table: those who like to control the camera, and those who did not. One study participant that controlled the camera a great deal stated that the computer control interfaces did not allow a user to feel in control. On the other hand, a study participant who did not control the camera much stated that having the computer control the main image allowed the study participant to concentrate on listening and watching without the distraction of controlling the image. Thus, the study results indicate that user interfaces should allow both computer control and manual control of camera views.

The user interface study also found that camera switching latency has an effect on the quality of the meeting viewing experience. The study indicated that when the camera view was too slow in changing whenever a new person started talking this was highly distracting. Thus, the study indicates that it is important to control and reduce camera switching latency.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for capturing and viewing an event having event participants, comprising:
    capturing a seamless omni-directional image of the event;
    automatically tracking event participants simultaneously to determine the event participants that are speaking using audio analysis including a microphone-array sound source localization technique to alleviate camera view switching delays;
    filming the event;
    monitoring and keeping track of each of the tracked event participants simultaneously using video tracking techniques;
    broadcasting the event;
    using a probabilistic finite state machine and receiving as input audio and video tracking results to automatically select at least a portion of the omni-directional image as an output view; and
    allowing a viewer to view the output view of the broadcasted event on a viewer platform.

2. The computer-implemented method of claim 1, further comprising using an omni-directional camera system including a camera having a wide-angle view of approximately 360 degrees to capture the seamless omni-directional image of the event.

3. The computer-implemented method of claim 2, wherein the camera includes a wide-angle imaging device.

4. The computer-implemented method of claim 1, further comprising using an omni-directional camera system including a plurality of cameras that combined provide an approximately 360-degree field-of-view to capture the seamless omni-directional image of the event.

5. The computer-implemented method of claim 1, further comprising using an omni-directional camera system having a resolution of approximately 1000 by 1000 pixels to capture the seamless omni-directional image of the event.

6. The computer-implemented method of claim 1, further comprising finding and indexing the event participants.

7. The computer-implemented method of claim 1, wherein using a probabilistic finite state machine and receiving as input audio and video tracking results to automatically select at least a portion of the omni-directional image as an output view further comprises applying a set of expert production rules based at least in part on a display history of an event participant.

8. The computer-implemented method of claim 1, wherein the seamless omni-directional image of the event contains multiple camera views, and further comprising providing instantaneous switching between the multiple camera views.

9. The computer-implemented method of claim 8, wherein the seamless omni-directional image of the event provides an infinite number of viewpoints, with each of the viewpoints corresponding to a portion of the omni-directional image, such that instantaneous switching is supported for an infinite number of viewers that select arbitrarily different viewpoints.

10. The computer-implemented method of claim 1, further comprising providing a user interface on the viewer platform that allows an arbitrary number of viewers to view an arbitrary number of viewpoints of the broadcasted event.

11. A computer-implemented method for filming and recording an event having event participants and presenting the event to a viewer, comprising:
    a recording step for filming and recording the event using an omni-directional camera system to provide a seamless omni-directional image that contains each of the event participants;
    a detection step for automatically determining a location of the event participants in the omni-directional image by using a speaker detection technique to determine the event participants that are speaking;
    a tracking step for tracking multiple event participants simultaneously using the speaker detection technique and a video tracking technique;
    a selection step for providing a user interface that allows a choice of which of the event participants in the omni-directional image to view, the choice being made by at least one of: (a) manually by the viewer; and (b) automatically by a virtual director that uses a probabilistic finite state machine and receives as input audio and video tracking results from the speaker detection and video tracking techniques; and
    a switching step for switching instantaneously between views of the event participants in the omni-directional image in response to the choice.

12. The computer-implemented method as set forth in claim 11, further comprising an annotation step for storing annotations associated with the event and synchronizing these annotations with the event.

13. The computer-implemented method as set forth in claim 12, further comprising allowing the viewer to select which of the annotations to store.

14. The computer-implemented method as set forth in claim 12, wherein which annotations to store may be selected: (a) while the event is occurring; (b) after the event has occurred.

15. The computer-implemented method as set forth in claim 12, wherein the annotations include at least one of: (a) a whiteboard; (b) a digital chat regarding the event; (c) a digital question and answer session over a computer network.

16. The computer-implemented method as set forth in claim 11, wherein multiple camera views are obtained from the omni-directional image and wherein the tracking step further comprises using the speaker detection technique to follow event participants that are speaking by switching from one camera view to another camera view.

17. The computer-implemented method as set forth in claim 11, wherein the omni-directional camera system is one of: (a) a single panoramic camera; (b) an array cameras having an approximately 360-degree field-of-view.

18. A computer-readable storage medium having stored and encoded thereon computer-executable instructions for displaying at least a portion of a seamless omni-directional image capturing an event occurring within an event environment, comprising:
    filming the event and automatically tracking multiple event participants simultaneously using audio and video processing techniques and a single omni-directional camera system having a single camera to produce the seamless omni-directional image;
    transmitting the omni-directional image from a broadcasting platform to a viewer platform using a computer network;
    using a probabilistic finite state machine that receives as input audio and video tracking results from the audio and video processing techniques to automatically select which portion of the omni-directional image to view;
    using the viewer platform to allow a viewer to select as one state of the probabilistic finite state machine which portion of the omni-directional image the viewer would like to view; and
    switching instantaneously between views of the omni-directional image by presenting a desired portion of the omni-directional image as selected by the viewer.

19. The computer-readable storage medium of claim 18, wherein the viewer selects to view multiple portions of the omni-directional image.

20. The computer-readable storage medium of claim 18, wherein the omni-directional image contains all event participants within the event environment.

* * * * *